April 23, 1935.  A. A. STEINMETZ ET AL  1,998,741
VOLTAGE REGULATOR
Filed April 29, 1933
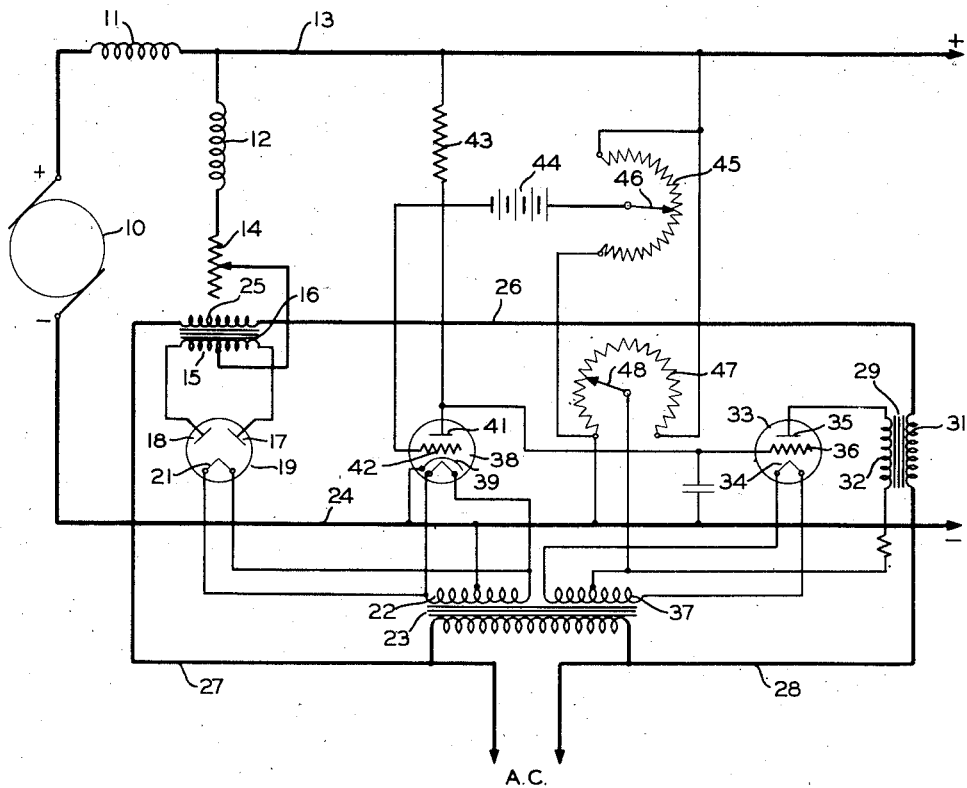
INVENTORS
A. A. STEINMETZ
H. M. WARD
BY Eugene C. Brown
ATTORNEY Patented Apr. 23, 1935

1,998,741

UNITED STATES PATENT OFFICE 1,998,741

VOLTAGE REGULATOR

Alfred A. Steinmetz, Locust Valley, and Harley M. Ward, Scarsdale, N. Y., assignors to The Western Union Telegraph Company, New York, N. Y., a corporation of New York Application April 29, 1933, Serial No. 668,650

8 Claims. (Cl. 171—225)

This invention relates to voltage regulators of the type which may be applied to dynamo electric machines in general but which has particular application to direct current generators. The invention has for an object to provide a regulator which will respond to slight changes in the potential of the power current and which employs no magnetic relays or other devices operating mechanically.

Regulators have been proposed, heretofore, which employ relays of the electronic type to take the place of mechanical relays formerly employed. However, prior types of electronic regulators have been either relatively uncertain in their response or have been comprised of many complicated and delicate parts which add considerably to the cost of the device.

It is an object of this invention to devise an electronic regualtor which employs only simple inexpensive and sturdy elements.

Among the electronic regulators heretofore devised it has been proposed to employ grid controlled tubes or valves connected in series with a regulating winding of the machine. The disadvantage of this arrangement is that ordinary grid controlled valves are capable of passing relatively small amounts of current, it being necessary to employ several of these valves suitably arranged, such as in parallel, to pass enough current to provide the desired regulating effect upon the generator. It has also been proposed to employ rectifiers of the diode type in series with the regulating winding of the generator and effect a control of the current passed by regulating the emission of a heated cathode in said valve.

According to this invention, a rectifier of the diode type is employed having its cathode and anode connected in series with the regulating winding and means for varying the amount of current which said rectifier will pass by changing the potential or electric stress imposed between the electrodes of the rectifier. For accomplishing this a unique arrangement is provided which acts to vary directly the potential of the current impressed upon the anodes of the rectifier in response to the variations in the potential output of the generator.

It is another object of this invention, therefore, to provide a regulator for a dynamo electric machine, employing an electronic element in series with a regulating winding of the machine, and means for varying the electrical stress between the elements of said rectifier.

It is a further object of this invention to effect the regulation of an electronic element controlling the current passed through a regulating winding of a generator by modifying the potential of the source of current to be rectified.

A still further object is to provide a modification of the rectifier current source by changing the value of an impedance connected in series with the rectifier and the source of current by means of an arc discharge tube of the grid controlled type.

These and other objects will be apparent from the following description taken in connection with the accompanying drawing forming a part of this application, which shows diagrammatically the circuit arrangement of the preferred form of this invention.

Although in its preferred form the invention is applied to a direct current generator it is to be understood that it may be used to regulate other types of current supply. The drawing shows a generator having an armature 10, a series field winding 11, and a shunt field winding 12. One side of the shunt field winding is connected to the positive output conductor 13. The other side of said winding is connected through a variable rheostat 14 to the center tap of the winding 15 of the transformer 16. The opposite ends of the winding 15 of the transformer 16 are connected to a pair of anodes 17 and 18 of the rectifier 19. The rectifier 19 may be of any suitable type which passes a substantial amount of current and which preferably has an anode operating characteristic in which the amount of current passed by the rectifier varies substantially with a moderate variation in the potential applied to the anodes. The rectifier employed is not limited to the type described. Any other suitable well known type of rectifier may be used. Referring again to the drawing, it shows the rectifier provided with a cathode 21 through which the shunt winding 12 is completed by way of leads which connect with a separate winding 22 of a suitably energized heater or power transformer 23, the center tap of which winding is connected with the negative power conductor 24 of the generator.

The source of potential or electrical stress for the electrodes of the rectifier is the combined effect of the potential impressed by the transformer 16 and the direct current potential across the rectifier due to the fact that the anodes of the rectifier are connected to the positive power conductor and the cathode connected to the negative power conductor. The latter stress might be considered as the normal steady current potential impressed upon the rectifier. Due to this a certain amount of current is passed by the rectifier independent of any alternating current imposed upon the anode elements. This current must be taken into consideration in arriving at the operating characteristics of the rectifier. In other words, a characteristic curve showing the ratio between the current passed and the potential stress upon the rectifier will include this direct current stress.

The regulating effect of the rectifier is derived, however, from an alternating current impressed upon the electrodes of the rectifier which is changed to the direct current. The alternating current for the anodes 17 and 18 is derived from the winding 15 which forms the secondary of the transformer 16. The transformer 16 is provided with a primary winding 25 which is connected in an alternating current circuit including conductors 26, 27 and 28, connecting with a suitable source. The transformer 16 by means of its primary winding 25, constitutes what may be termed a first impedance in the alternating current circuit. A second impedance is connected in this circuit in series with the first impedance. The second impedance comprises the transformer 29 having its primary winding 31 connected in series with the winding 25. The secondary winding 32 of the transformer 31 is arranged to impress alternating pulses of a suitable value upon the elements of an electronic element 33. The element 33 preferably comprises a tube or a valve of the arc discharge type in which a grid is employed to initiate the discharge through the valve but which loses control over the discharge once it has begun to flow. It may comprise a heated cathode 34, an anode 35, and a third element or grid 36 which initiates or triggers off the discharge flow of the tube.

The cathode of this tube is heated by alternating current derived from winding 37 of the alternating current transformer 23. The center tap of the winding 37 is connected to one side of the secondary winding 32 while the other side of the latter winding is connected to the anode 35 of the arc discharge tube, causing an alternating current to be impressed upon the anode.

The operation of the arc discharge tube 33 with an alternating potential upon its anode is well known to those skilled in the art. Briefly explained, however, before the tube breaks down, the discharge therethrough is held in check by the grid 36 being maintained below a critical value with respect to the cathode. No discharge will occur through the tube so long as this condition of the grid is maintained. On the other hand, as soon as the value of the grid potential is raised above the critical value, the suppressing effect thereof is removed and a discharge occurs between the cathode and the anode during one half of each alternating current cycle. Once the discharge is begun, it is no longer affected by the potential of the grid and is extinguished only when the anode potential is reduced to zero or below its critical value as the alternating current reverses. The result is that during periods when potential of the grid is above the critical point the tube will pass current for the positive half of each cycle. On the other hand when the grid potential falls below the critical point no current is passed.

During periods when the discharge tube 33 is activated it permits current to pass through the secondary winding 32 of the transformer 29. This current by increasing the saturation of the core of the transformer reduces the impedance of the primary 31 to the passage of current therethrough from the alternating current circuit. This reduction of the impedance in one part of the alternating current circuit causes an increase in the potential drop across the winding 25 of the transformer 16 coupled in another part of the circuit. This increased drop induces an increased potential in the secondary 15 of the transformer, which impressed upon the anodes 17 and 18, results during such periods, in an increase in the current passed by the rectifier through the shunt field winding 12 increasing the potential of the generator output. This principle of the control of series inductances by regulating the value of one inductance to transmit a regulating effect to the other inductance will be readily understood by those skilled in the art. The principal advantageous feature is the accomplishment of such regulation without employing mechanically operated relays to transmit the controlling effects.

The grid 36 which controls the discharge tube 33 is conditioned in accordance with the change in the potential output of the generator 10 through an amplifier including tube 38, controlled by the potential difference between the positive power conductor 13 and the negative power conductor 24. The use of an amplifier increases sensitivity to potential changes. One or more tubes may be employed to produce the desired amount of amplification of the potential changes. In its simplest form it may employ only a single tube provided with cathode 39, anode 41 and grids 42, as illustrated in the drawing. The anode 41 of this tube is connected through a current limiting resister 43 to the positive power conductor 13. The cathode 39 of the tube is connected directly to the negative power conductor 24 by a wire extending from the terminal of the cathode directly to the conductor. Thus the potential between the cathode and the anode of the tube would be equal to that between the power conductors, less the drop through the resistance 43. The grid is connected through a biasing battery 44 to the movable arm 46 of a potentiometer 45. The resistance element of the potentiometer is connected directly across the power leads, as may be observed from the drawing. The biasing battery 44 is connected with this negative side to the grid 42 and its positive side to the arm of the potentiometer.

For normal operating conditions the potentiometer 45 is adjusted so that the movable arm 46 connects with a point sufficiently positive to practically overcome the effect of the negative biasing battery 44 and maintain the bias of the grid 42 of the tube 38 sufficiently low to cause the latter tube to pass a substantial amount of current.

In order to adjust the normal potential difference between the grid and cathode of the arc discharge tube 33 to a proper value, a second potentiometer 47 is connected across the power conductors and its movable arm 48 connected to the center tap of the transformer winding 37 which is employed to heat the cathode 34. By suitably adjusting the two potentiometers the response of the regulator can be controlled.

The operation of the regulator to maintain the output of the generator substantially constant will now be described. Upon a reduction of the generator output potential or the potential between the power conductors 13 and 24 the point on the potentiometer 45 at which the arm is set will become less positive with respect to the cathode of the tube 38. This results in a decrease in the potential difference between the potentiometer 45 and the constant potential of the negative biasing battery 44, which in turn depresses the potential of the grid 42 causing the amplifying tube to pass a less amount of current. A decrease in the current through the tube and resistance 43 reduces the drop across the resistance. As a result the potential of the grid of the tube 33, which is connected directly to the anode circuit of the amplifying tube, rises to the breakdown potential with respect to its cathode. This permits the discharge tube 33 to pass current through the secondary of the transformer 29. As long as the grid 36 remains above its critical or breakdown point the tube allows current to pass during each positive half-cycle of the alternating current impressed thereon through transformer 29. As already described the primary of the transformer 29 is connected in series with the primary of another transformer 16. Through the secondary winding of this an alternating potential is impressed upon the anodes of the rectifier tube 19. The characteristics of these transformers are such that an increase in the load or the current passed through the windings of the transformer 29 acts to reduce the impedance of its primary as compared to the impedance of the primary of the transformer 16. Consequently as the voltage drop across the primary of the transformer 29 decreases, in proportion to the amount of current passed by the gas discharge tube, the voltage drop across the primary of the transformer 16 correspondingly increases. The secondary winding of the transformer 16 is designed to supply sufficient current, in addition to the direct stress heretofore noted, to maintain a predetermined minimum current flow through the shunt field winding 12 when the secondary of the transformer 29 is not loaded by the passage of current through the discharge tube. Therefore, during the periods when the discharge tube passes current the potential pulses applied to the anodes of the rectifier tube are correspondingly increased causing an increase in the field current and the generator voltage. When the generator voltage has increased to such an extent that by action of the amplifier the grid of the discharge tube falls below the critical point it ceases to pass current through the secondary of the transformer 29 decreasing the potential across the rectifier tube and the current in the field winding. This cycle is repeated at frequent intervals depending upon the amount of additional field current required to keep the generator at the desired average voltage.

It would at first appear that these cycles of current change across the rectifier would reappear as definite cycles of generator potential variation. However, due to the extreme sensitivity of the voltage regulator control effected by the use of the electron tube arrangement described, only extremely small variations in the generator potential are necessary to bring the regulator into play, with the result that the potential is restored. The potential variations which do occur before the regulator responds are so slight and so frequent that they show up as slight voltage ripples which are not objectionable in the current supply required in telegraph service and the like and which can be detected only by the oscillograph or other extremely sensitive instrument.

From the foregoing description it will be seen that a regulator has been provided which is extremely sensitive to changes in the power current potential connected with a dynamo electric machine and which at the same time responds instantly to changed conditions to apply a corrective current to suitable portions of the machine. The particular advantage accomplished will be the elimination of all mechanically operated relays with their attendant sluggishness and uncertain short lived operation. Another advantage which will appear to those skilled in the art is an arrangement in which a rectifier tube of a suitably large capacity enclosed in a single envelope is employed and means provided for controlling the same by indirectly controlling the potential applied to its electrodes. The arrangement is further simplified by employing a sensitive grid controlled arc discharge tube of the mercury vapor or similar type suitably conditioned by amplified variations of the power circuit potential of the machine to effect a variation in the impedance of an element connected in series with the transformer providing alternating current potential to the rectifier.

It is to be understood that this invention is not limited in its application to direct current generators. By suitably modifying the apparatus in a manner which would readily occur to those skilled in the art, it may be employed for regulating the voltage of a current supplied from substantially any power source such as a battery and alternating current generator or the like. It may also be applied to regulating the potential of current supplied to various devices such as a motor or the like.

It will be readily apparent to those skilled in the art that the invention may be embodied in other forms of circuit combinations without departing from the spirit thereof. It is therefore desired that this invention shall not be limited to the embodiment shown and that the limitations shall be only those imposed by the prior art or the appended claims.

What we claim is:

1. The combination in a voltage regulator for maintaining the output potential on a direct current generator substantially constant, a generator having a field winding arranged to correctively control the potential output thereof by a variation of the current through said winding, of a rectifier in series with said field by means of which the field current is varied to effect the correction, and independent circuit for supplying an alternating current to said rectifier, said circuit embodying first and second impedances, the combined voltage drop of which is a substantially constant value, the drop across the first of which determines the potential of the current supplied to the rectifier, and means controlled by the output potential of the generator for varying the value of the second impedance in such a manner as to vary the drop across the first impedance and the current supplied to the rectifier in the proper direction to supply the required corrective current to said field.

2. The combination of a direct current generator, a voltage regulator for maintaining the output potential of said generator substantially constant, said generator having a shunt field winding arranged to provide a regulative effect upon the output of said generator when the current through said winding is varied, said regulator comprising a rectifier through which current is supplied to said shunt field, and independent circuit drawing an alternating current from a substantially constant potential source for supplying said rectifier, a transformer, the primary of which forms a first impedance in said supply circuit, the secondary of which is arranged to supply a potential to said rectifier which varies in accordance with the drop across the primary, a second impedance in said circuit, means controlled by the output potential of the generator for varying the drop across the second impedance, thereby varying the drop across the first impedance and the current supplied to the rectifier in the proper direction to pass a suitable corrective current through said field.

3. In combination, a dynamo electric machine embodying a winding for controlling the output potential by varying the current therethrough, a regulator for varying said current in response to changes in the output potential of said dynamo, said regulator embodying an electrionic valve in series with said control winding, means for furnishing operating potentials to said valve from an auxiliary circuit, said means embodying a coupling between said valve and said auxiliary circuit, said coupling constituting a first impedance in said auxiliary circuit, a second impedance in said auxiliary circuit, a grid controlled arc discharge valve having its grid conditioned in accordance with the output potential of said generator, said valve being coupled to pass current through a winding of said second impedance thereby reducing the value of the same when said output potential falls below a predetermined value, the reduction in said impedance causing an increase in current passed by the coupling comprising the first impedance whereby the current through said dynamo winding is increased, causing the output potential thereof to be raised.

4. In combination, an electric generator, a winding associated therewith and connected across a current source for controlling the output potential of the generator by varying the current through the winding when the output potential of the generator tends to vary, a regulator for varying the current in said winding inversely with respect to the variations in said potential, said regulator embodying an electrionic valve comprising a cathode and an anode in series with said control winding; an alternating current auxiliary circuit, a transformer having its primary connected in series in said auxiliary circuit and a secondary arranged to impress an alternating current upon the anode of said valve, a second transformer having its primary connected in series with said first transformer in the auxiliary circuit, means conditioned in accordance with the output potential of said generator for reducing the value of the impedance of said second transformer when the output potential falls slightly, causing at the same time an increase in the drop across the primary of the first transformer, increasing the potential applied to the anode of said valve and likewise the current passed thereby.

5. In combination, a direct current generator having a winding associated therewith and arranged to provide a regulative effect upon the output potential of the generator by a variation of the current therethrough, a regulator responsive to the changes of the output potential of said generator for varying the current in said winding, said regulator embodying a grid controlled discharge tube having a trigger operating characteristic and means to impress upon this grid a voltage which varies inversely with the changes of the generator output potential, a diode rectifier in series with said generator winding, a separate circuit for supplying alternating current to said rectifier, first and second transformers having their primaries connected in series in said separate circuit, the secondary of the first transformer being arranged to supply alternating current to the electrodes of said rectifier, the secondary of the second transformer being arranged to supply alternating current to the anode and cathode of the trigger tube, said trigger tube being adjusted to pass current during each alternating current cycle at times when the current impressed upon the grid of said tube is made positive in response to a decrease in the generator output potential, said trigger tube when passing current acting to increase voltage applied to the rectifier by changing the ratio of the impedances of said transformers in a direction to increase the drop across the primary of the first transformer.

6. In a voltage regulator, a rectifier through which a regulating current is passed, means for varying the current through said rectifier, said means comprising an alternating current circuit, a transformer, the primary of said transformer forming a first impedance in said alternating current circuit, the secondary of which is arranged to supply a potential to the electrodes of the rectifier which varies in accordance with the drop across the primary of said transformer, a second impedance in said alternating current circuit, means controlled by the regulating current demand for varying said second impedance in accordance with variations in said demand, thereby varying the drop across the first impedance and the current passed by the rectifier energized by the transformer.

7. In a voltage regulator, a rectifier for suplying a regulatory current, a first transformer, the secondary of which is arranged to supply current to the electrodes of said rectifier, a second transformer, means for varying the current through the secondary of said second transformer in accordance with the regulatory current demand, the primaries of said transformers being coupled in series in an alternating current circuit, whereby as the current through the secondary of the second transformer is increased its impedance is correspondingly decreased causing the drop across the first transformer to increase and likewise the current passed through the rectifier energized thereby.

8. The combination in a voltage regulator system for maintaining a supply of voltage substantially constant, of a current path embodied in said system which will act by a suitable variation of the current through the same to effect a correction of the voltage in the system when it tends to vary, a rectifier in series with said path, a first transformer the secondary of which is arranged to supply current to the electrodes of said rectifier, a second transformer, means for varying the current through the secondary of said transformer in accordance with the tendency of the voltage in said system to depart from a predetermined standard, the primaries of said transformers being coupled in series in an alternating current circuit, whereby as the current through the secondary of the second transformer is increased, its impedance is correspondingly decreased, increasing the drop across the first transformer and likewise the current passed through said current path by the rectifier and vice versa.

ALFRED A. STEINMETZ.
HARLEY M. WARD.